June 6, 1939.　　W. L. REINHARDT ET AL　　2,161,383
MICROPOROUS DIAPHRAGM
Original Filed Nov. 20, 1933
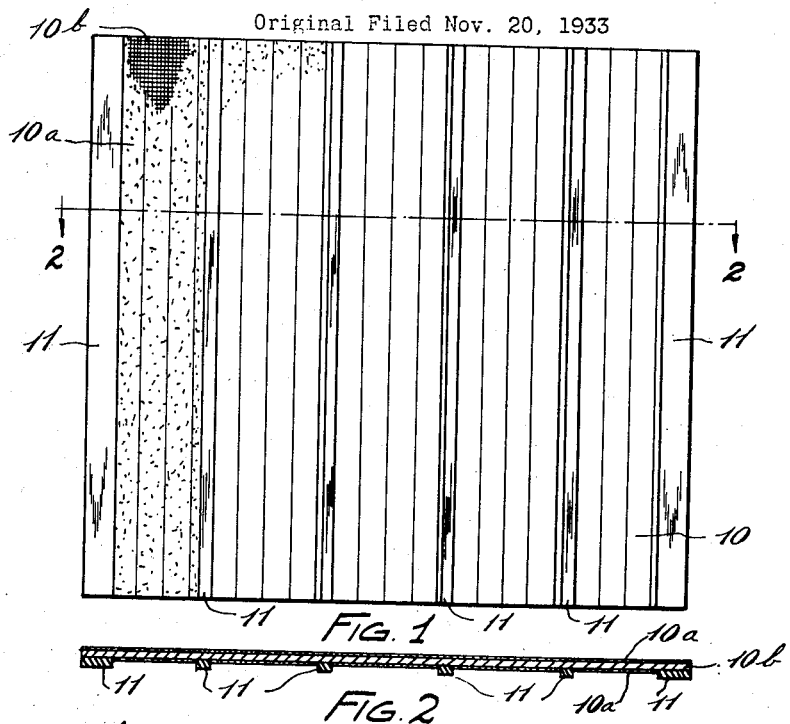
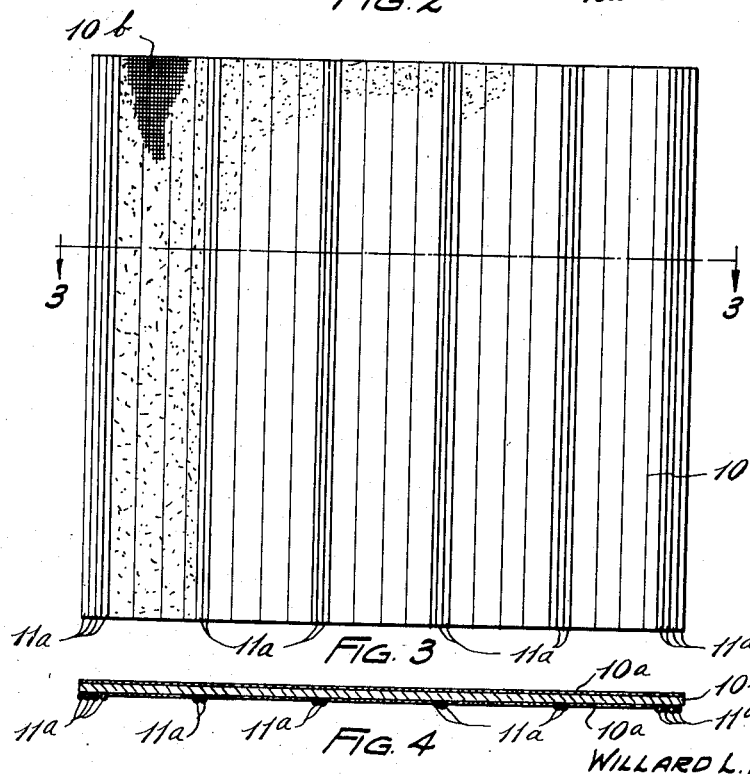
INVENTOR.
WILLARD L. REINHARDT
LELAND E. WELLS
BY Kwis Hudson & Kent
ATTORNEYS Patented June 6, 1939

2,161,383

UNITED STATES PATENT OFFICE 2,161,383

MICROPOROUS DIAPHRAGM

Willard L. Reinhardt, Shaker Heights, and Leland E. Wells, Cleveland Heights, Ohio, assignors to Willard Storage Battery Company, Cleveland, Ohio, a corporation of West Virginia Original application November 20, 1933, Serial No. 698,860, now Patent No. 2,052,490, dated August 25, 1936. Divided and this application August 6, 1936, Serial No. 94,612

6 Claims. (Cl. 136—146)

This invention relates to microporous diaphragms and especially to insulating diaphragms made principally for use as storage battery separators.

This application is a division of our copending application Serial No. 698,860, filed November 20, 1933, now Patent No. 2,052,490 granted August 25, 1936.

The principal object of the present invention is to provide diaphragms especially adapted for storage battery insulators or separators which have the desirable qualities and which are practically free from the undesirable characteristics of the best separators in use at the present time.

More particularly it is the object of this invention to provide a separator or diaphragm which has long life, which can be produced inexpensively, and which has the desired stiffness or rigidity, has low resistance, and has a high degree of porosity but with the pores of microscopic size so as to be readily permeable to liquids, such as the electrolyte of a storage battery, but not to solid particles of any appreciable size.

The invention may be here briefly summarized as consisting in an improved diaphragm having the structural characteristics hereinafter described.

In the accompanying sheet of drawings wherein we have illustrated an embodiment of the invention which is highly successful:

Fig. 1 is a face view of a storage battery separator formed in accordance with our invention with portions broken away to show the interior sheet of fabric;

Fig. 2 is a transverse sectional view of the same;

Fig. 3 is a face view of a separator modified as to the form of the ribs, a portion only of the separator being shown; and Fig. 4 is a transverse sectional view of the same.

Generally speaking, our improved diaphragm consists of a sheet or layer of porous material filled and coated with a suitable inert microporous material, such as microporous rubber, the coating and fill'ng material being only of sufficient thickness with respect to the sheet of porous material, which is preferably cotton fabric, to give the latter the required stiffness and rigidity, and, of course, to provide the microscopic character to the porosity of the diaphragm as a whole.

Different kinds of porous material may be employed, as, for example, cotton fabric or unwoven fibrous material, such as paper stock, but preferably a thin sheet of woven cotton fabric with a fairly open weave is employed.

The microporous filling and coating material is preferably rubber, made either from natural latex or artificial latex, preferably the former, in the manner or in approximately the manner disclosed in United States Patent No. 1,745,657, granted February 4, 1930, to Hermann Beckmann. In following this procedure, latex compounded with sulphur and possibly other ingredients, such as accelerators, is gelled with a suitable gelling solution, such as magnesium sulphate, in a manner such that the water and serums, consisting of carbohydrates, gums, etc., are retained in the reticular structure of the gel. After the gel is produced within and on the sides of the porous material, which, for convenience, will be referred to as fabric, it is vulcanized to hard rubber without permitting the escape of the retained water and incidentally the serums, the retention of the water in the gel during vulcanization, as explained in the Beckmann patent, being important to secure the microporous character of the rubber during and after vulcanization.

It is important to the attainment of the desired results, in making our improved composite diaphragm, that a method be employed of such a nature that a controllable amount of latex compound be caused to gel on the two surfaces and in the interstices of the fabric, and it is desirable also that a method be employed such that the diaphragms are produced by a continuous process, at least up to the point of vulcanization.

These results are obtained by the below described method, which, briefly stated, is:

*First.*—Impregnating the fabric, which can be of any desired predetermined width and either of predetermined or indefinite length, with the gelling solut'on which is preferably magnesium sulphate of a definite strength, depending upon the nature of the coating required.

*Second.*—The volume of the gelling solution retained in the fabric is regulated to the desired amount, so as to remove the excess solution and leave the interstices open.

*Third.*—The impregnated fabric is then passed through a rubber dispersion, such as a bath of latex compound of known solid content, preferably with the fabric stre'ched taut, in a manner such that both sides are in contact with the compound.

*Fourth.*—The fabric being filled and coated on both sides, the gelling is permitted to take place, and the process is preferably speeded by passing the gelling sheet through hot water vapor (exhaust steam, for example) so as to set the gel without loss of retained water. In so doing, the gel is firmly set before it is allowed to touch anything which will disturb its structure, as otherwise it will collapse, losing its porosity or separating from the fabric. After the gel is set, a continuous film of dispersed rubber-water gel covers the sides and fills the interstices of the fabric, so as to provide a condition which, after vulcanization, forms an interlock between the microporous rubber and the fabric, the open weave fabric being preferably employed for that specific purpose.

*Fifth.*—Depending upon the desired thickness of the microporous films or layers on the sides of the fabric, the treated sheet may be given a second pass first through a gelling solution and then through the latex compound, the two (or more) pass method also having the advantage of effectively covering any deficiencies in the first coating which may have been caused by bubbles due to air trapped in the meshes of the fabric during impregnation. After the sheet is given two or more passes through the gelling solution and latex compound, it is preferably caused to travel through a chamber containng hot water vapor after each such pass in order to hasten the gelling and cause the gel to set.

*Sixth.*—The gelled strip is then vulcanized without permitting the escape of the retained water, thus converting the set gel into microporous hard rubber. The vulcanization can be carried out in different ways, as will be explained subsequently.

In the drawing, 10 represents a diaphragm in the form of a separator adapted to be placed between the plates in a storage battery of the lead-acid type. The microporous rubber which coats the sides and fills the interstices of the fabric is indicated at 10a, and the fabric itself at 10b. This separator is shown as provided with ribs 11 which are preferably vulcanized to the separator body during the vulcanizing operation referred to above. The ribs may be formed of different materials, such as hard rubber or strips cut from the dispersed rubber impregnated and coated fabric sheet described above, or dispersed rubber impregnated and coated cords, the latter being illustrated at 11a in Figs. 3 and 4. The second and third mentioned types of ribs possess considerable advantage over ribs of plain rubber in that the ribs themselves, being of a porous nature, do not increase the electrical resistance of the separator to any appreciable extent. Furthermore, due to the fact that these ribs are porous, the separators as a whole do not displace as much electrolyte as would otherwise be the case.

We do not regard it essential that the ribs be formed on the sheet by vulcanizing rib-forming material thereon, as integral ribs may be provided by doubling portions of the sheet upon itself so as to make rib-forming folds. We might say, however, that we do not regard it essential that the separators be provided with ribs of any kind for the equivalent of the same can be secured by giving the sheet a corrugated form during vulcanization. The ribbed type is preferred by us, however, and further reference to the ribbing will be made later.

One way of vulcanizing and applying the ribs is as follows: The gelled strip may be cut into predetermined lengths and placed between mold plates, one of which may be provided with grooves in which is placed the rib-forming material, such as strips formed from hard rubber composition or strips cut from the gelled sheet treated in the manner just explained, or any other material which can be vulcanized to the strip during the vulcanizing operation. In practice, when a quantity of pairs of mold plates have had placed between them the pieces of the gelled strip and rib-forming material, the mold plates are placed in a vulcanizer and vulcanized in steam (or under water) so that during vulcanization the water will be retained in the reticular structure of the gel and the latex will be vulcanized to hard rubber and will, after vulcanization, have the microporous condition already explained and more fully described in the Beckmann patent refered to.

Instead of proceeding as above described, the gelled strip may be wound upon a drum, and, at the same time, rib-forming material, preferably gelled rib-forming material, is laid on the strip and caused to adhere thereto. At the same time, a fabric liner may be wound on the drum so as to separate the different convolutions of the gelled strip and keep them from sticking together which liner may be grooved to receive the rib-forming material. Next the loaded drum is conveyed to a vulcanizer where the gelled mass is vulcanized to hard rubber without the escape of the retained water. After vulcanization, the sheet or strip which is ribbed and is coated and has its interstices filled with microporous hard rubber is cut into sections of the size desired for storage battery separators.

Separators composed wholly of microporous rubber or even with fabric covered with preformed reticulous gel such as contemplated in the Beckmann patent for a given mechanical strength cannot be made as thin as and therefore will not have the low resistance of our separators with the gel formed from the dispersed rubber solution directly in the interstices and on both sides of the porous material, such as open weave fabric. The two layers are not only interlocked or formed continuous through the fabric, but the layers on opposite sides can be made as thin as desired, such as in the form of thin coatings or films.

To give a specific instance of proportions, we might mention that very good results have been obtained with separators of this kind having a thickness of approximately .028 inch, using an open weave fabric having an average thickness of approximately .018 inch. In other words, the fabric thickness exceeds the combined thickness of the two layers or films on both sides of the fabric, which makes it apparent that separators made in accordance with this invention and utilizing an inner sheet of open weave fabric in and on which the gel is produced and later converted into microporous rubber requires only a relatively thin outside layer of this microporous rubber to give the separator the desired strength and stiffness, this being an important factor in the attainment of the desirable low electrical resistance. So far as we are aware, these satisfactory results, especially the absolute control of the thickness of the layers which are applied to the fabric sheet, cannot be obtained by any other process than the one herein explained which has for its important characteristic the fact that the sheet is impregnated with a gelling solution and then passed through a latex or other dispersed rubber solution the concentration of which may be varied as desired, as can also the speed of passing the fabric through the bath, as well as the number of passes through the gelling solution and through the latex solution. Although the process is described and claimed in our Patent No. 2,052,490 referred to above, some of the important phases thereof are herein dwelt upon to emphasize the novel structural characteristics of the separator of this application and the important advantages of those novel structural characteristics.

We aim in our claims to cover all modifications which do not involve a departure from the spirit and scope of the invention in its broader aspects.

Having thus described our invention, we claim:

1. A porous diaphragm comprising a porous inner sheet having its interstices filled and its sides covered with thin films of vulcanized microporous rubber.

2. A porous diaphragm comprising a sheet of fabric having its sides covered with thin films of vulcanized microporous rubber which extends through the openings of the fabric so as to interlock the two films.

3. A diaphragm consisting of a sheet of fabric having relatively thin layers of vulcanized microporous rubber covering both sides and extending into the interstices thereof.

4. A diaphragm composed of an inner layer of fabric covered with vulcanized microporous rubber formed from rubber gel produced directly on the fabric and vulcanized while the liquid of the gel is interstitially included therein.

5. A diaphragm composed of an inner layer of fabric having its sides covered with vulcanized microporous rubber formed from rubber gel produced directly on the sides and in the interstices of the fabric and vulcanized while the liquid of the gel is interstitially included therein.

6. A diaphragm composed of an inner sheet of fabric covered with thin films of vulcanized microporous rubber formed from rubber gel produced directly on the fabric and vulcanized while the liquid of the gel is interstitially included therein.

WILLARD L. REINHARDT.
LELAND E. WELLS.